UNITED STATES PATENT OFFICE.

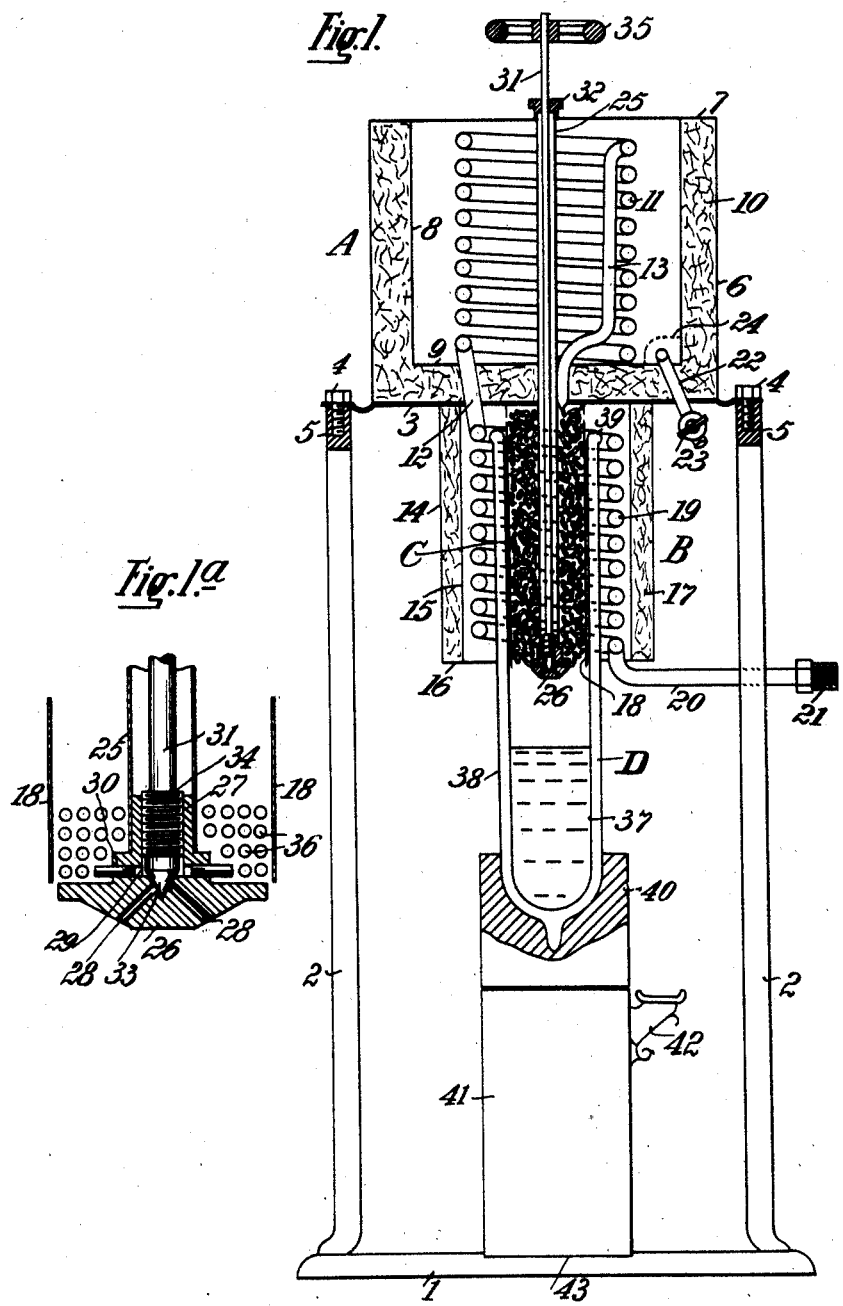

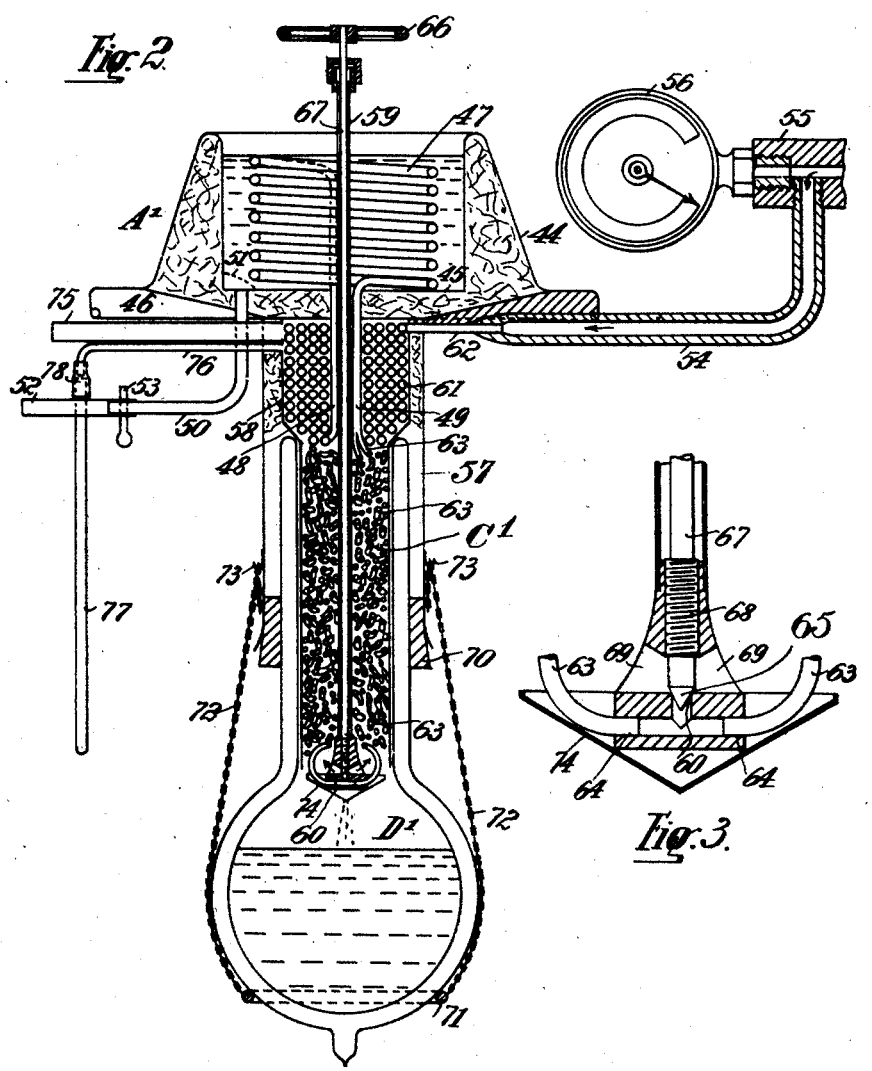

WILHELM PAUL SCHNEIDER, OF HAMBURG, GERMANY, ASSIGNOR TO GUSTAF HENRIK RYBERG, OF HAMBURG, GERMANY.

GAS-LIQUEFYING APPARATUS FOR DEMONSTRATION PURPOSES.

984,030.      Specification of Letters Patent.      Patented Feb. 14, 1911.

Application filed June 8, 1910. Serial No. 565,815.

*To all whom it may concern:*

Be it known that I, WILHELM PAUL SCHNEIDER, a citizen of the Empire of Germany, residing at Hamburg, in the Empire of Germany, have invented a new and useful Gas-Liquefying Apparatus for Demonstration Purposes, of which the following is a specification.

Since it has been made possible to liquefy the so-called permanent gases like air, hydrogen, helium, etc., and especially on account of the utilization and separation in the arts of such liquid gases it has been desirable for scientific purposes to demonstrate the liquefaction of gases in its progress. Hitherto only expensive and most complicated apparatus have been able to fulfil such requirements, and then only partly.

My invention consists of a simple gas liquefying apparatus, by means of which it is possible to liquefy gases very quickly and with minimal costs, within the space of 2 or 3 or at most 5 minutes and in so great a quantity as is necessary for the scientific experiments in question and the demonstration of the physical and chemical qualities.

The new apparatus is arranged for receiving any gas in its compressed state, first gradually cooling it down to a certain temperature, and then allowing it to expand, so that an intense cold is produced and a part of the gas quickly liquefies, while the other part escapes and is utilized for cooling the compressed gas supplied.

The new apparatus comprises a first temperature exchanger, a cooler therewith connected, a second temperature exchanger connected at one end with the cooler and at the other end with a throttle valve adapted to be operated by hand, a double-walled receiving glass vessel adapted to be moved with its neck from below over the second temperature exchanger for receiving the liquefied gas, and means for supporting the receiving glass vessel and permitting its removal. The second temperature exchanger is specially constructed for this purpose and consists of tubes which are not wound but twisted or plaited. As the receiving glass vessel can be easily removed and handled, no loss of liquefied gas can occur and the breaking of the glass vessel is prevented.

By the construction of the new apparatus the receiving glass vessel is effectively protected from cracking.

I will now proceed to describe my invention with reference to the accompanying drawings, in which—

Figure 1 is a vertical longitudinal section through the apparatus, Fig. 1ª is a part out of Fig. 1 on an enlarged scale and shows the throttle valve, Fig. 2 is a vertical longitudinal section through a modified apparatus, and Fig. 3 is a part out of Fig. 2 on an enlarged scale and shows the throttle valve.

The frame of the apparatus illustrated at Fig. 1 is shown to consist of a base 1, several pillars 2, 2 made from metallic tubes, and a top plate 3 secured on the pillars 2, 2 by means of screws 4, 4 and filling pieces 5, 5 fastened in the tubes 2, 2 by soldering, welding or the like. On the top plate 3 are placed an outer cylinder 6, an annular top plate 7, an inner cylinder 8 and a bottom 9, all of these parts being made from thin metallic plates which may be soldered up to form a double-walled vessel A open at the top. The space 10 between the said parts is filled up with a bad heat conductor, such as for example wool, wooden chips and the like.

Within the vessel A is disposed a metallic coil 11 the ends of which are connected with tubes 12 and 13 passing through the bottom 9 and the top plate 3 and fastened therein by soldering. At the underside of the top plate 3 are fastened by soldering two concentric metallic cylinders 14 and 15 which form a double-walled vessel B open below. The annular space 17 between the parts 14 and 15 is closed by an annular plate 16 soldered on and is filled with a bad heat conductor. A third cylinder 18 made from thin sheet metal is fastened by soldering at the underside of the plate 3 concentrically with the two cylinders 14 and 15. In the annular space between the inner cylinder 15 of the vessel B and the cylinder 18 is disposed a metallic coil 19, the upper end of which is connected with the already mentioned tube 12, while its lower end is connected with a horizontal tube 20 carrying at its outer end a screwed piece 21 of any known construction. The piece 21 should be arranged for connecting the tube 20 with the delivery end of any steel flask or cylinder containing compressed gas. From the bottom 9 of the vessel A a draining pipe 22 leads to without, this pipe being fastened in the two plates 3 and 9 by soldering and being provided with a cock 23 or the like. A sieve 24 may be disposed above the upper end of the draining pipe 22. A central tube 25 extending from the level of the top plate 7 down to about the level of the bottom plate 16 is fastened in the two plates 3 and 9 by soldering and carries at its lower end a sort of disk 26 (see Fig. 1ª), which has a smaller diameter than the cylinder 18. The disk 26 serves as a valve casing and is provided with a female screw-thread 27, several inclined channels 28, a chamber 29 and several horizontal channels 30. A spindle 31 passes through a stuffing-box 32 of any known construction at the upper end of the tube 25 and through the whole length of the latter, and its lower tapering end 33 serves as a throttle valve. Above this valve 33 the spindle 31 is provided with a screw-thread 34, which engages the female thread 27. A suitable hand-wheel 35 is fastened at the upper end of the spindle 31 for operating the throttle valve 33. The lower end of the tube 13 is connected by soldering with several thin metallic tubes 36, 36, which are plaited somewhat like a braid of hair, only that the turns are very long, and are then wound around the tube 25 first downward, then upward and perhaps again downward, in a similar manner as any yarn or thread is wound on a spool by any known spooling machine. Where so preferred, the plaited metallic tubes 36, 36 may be wound on the tube 25 in one or several turns of a spiral beneath the top plate 3, until they touch the cylinder 18, then wound in a next lower layer in turns of an opposite spiral until they touch the tube 25 and so on in layers following one another downward. In this manner the annular space between the cylinder 18 and the tube 25 is filled up with the plaited and wound thin metallic tubes 36, 36, the lower ends of which are inserted in the horizontal channels 30 of the disk 26 and are therein secured by soldering. All the tubes 36, 36 with the cylinder 18 and the disk 26 serve as a regenerator or as a second temperature exchanger C, while the coil 19 with the protecting vessel B serves as a first temperature exchanger. The upper vessel A with the coil 11 serves as a cooler, the inner space being filled with any known freezing mixture.

D denotes any known double-walled glass vessel adapted to receive the liquefied gas. Its two concentric walls 37 and 38 are connected together at the upper ends by a molten roll-shaped edge 39, which is shown to be a little widened for facilitating the introduction of the vessel D from below into the space between the cylinder 18 and the coil 19. Of course sufficient space should be left within the coil 19 for permitting the easy introduction and removal of the vessel D, and also a small play should be left between the inner wall 37 and the cylinder 18. From the annular space between the two walls 37 and 38 and their bottoms the air has been pumped out to produce a vacuum and the inside of the inner wall 37 is coated with silver, so as to render the transmission of heat from without to the liquefied gas very slow. Preferably several vertical strips are removed from the silver coat in order to be able to see the liquefied gas. The regenerator C is shown to fill up the upper half of the vacuum vessel D. It is necessary to hold the vacuum vessel D in this position until it has received a sufficient quantity of liquefied gas. For this purpose the lower end of the vacuum vessel D may be embedded in a suitable foot 40 of wood or the like. A removable support 41 of wood or the like and provided with a handle 42 may be employed for supporting the foot 40 with the vessel D and may be inserted in a shallow recess 43 provided in the base 1 for insuring its correct central position. The support 41 should be made so high, that after its removal to a side it is possible to move the filled vessel D with its foot 40 first downward and then sideward.

The apparatus described is operated as follows: The gas, for instance air, which is to be liquefied is passed into the tube 20 from a steel cylinder containing the gas at about 120 atmospheres pressure. After this cylinder has been connected with the screwed piece 21 its valve is opened. Of course the throttle valve 33 is now opened. The compressed air passes through the coil 19 and is therein gradually cooled by a current of cold air passing downward, which will be referred to later on. The cooled compressed air enters through the tube 12 the cooling coil 11 submerged in the freezing-mixture and is therein further cooled. From the coil 11 the cooled compressed air passes through the tube 13 into the regenerator C, through the several thin tubes 36, 36 of which it passes while being still further cooled by an upwardly passing current of cold air to be presently mentioned. On leaving the regenerator C the cold compressed air passes through the chamber 29 and along the outside of the opened throttle valve 33 into the channels 28, 28, from which it escapes downward into the space of the vacuum vessel D, so that it can expand and its temperature will be so much reduced by this expansion, that a part of the air liquefies and flows into the vessel D, while the other part in a most cold gaseous state passes upward between the various thin tubes 36, 36 of the regenerator C and cools the compressed air therein. In other words the regenerator C acts as a temperature exchanger, so that the temperature of the upwardly passing current of air having but a small pressure is gradually raised, before it passes through holes provided in the cylinder 18 near the top plate 3 and turns around the edge 39 of the vessel D and passes downward for preliminarily cooling the compressed air passing upward through the coil 19. It will now be clear, how the coil 19 acts as a first temperature exchanger. On leaving the lower mouth of the space between the inner cylinder 15 and the outer wall 38 of the vacuum vessel D the escaping air will have reduced its pressure but increased its temperature. When the vacuum vessel D has received a sufficient quantity of liquefied air, the throttle valve 38 is closed and the vessel D or its foot 40 can be seized with one hand and a little raised for permitting the withdrawal of the support 41, after which it is moved first downward and then sideward, when it can be used.

Apparatus of this character heretofore employed had the disadvantage that it was advisable to operate the same only with air having a pressure of two hundred atmospheres. With the known apparatus, it was possible, on account of the serious loss of cold, to permit the air to expand from a pressure of two hundred atmospheres to a pressure of ninety atmospheres only, an additional expansion below ninety atmospheres being impracticable for the reason that too great a loss would be caused, which loss would be in no reasonable proportion to the production of the apparatus. The apparatus constructed in accordance with the present invention, however, can be operated at a much greater advantage because the air to be introduced need have only a pressure of a hundred atmospheres, and it is possible to permit the expansion of this air down to a pressure of fifty atmospheres in order to obtain the necessary coldness for the liquefaction. With the present apparatus, on the contrary, the cooling produced by expansion is sufficient when the gas (air) is compressed to 100 atmospheres, while with the expansion of air compressed to 50 atmospheres a good efficiency may still be obtained. This circumstance is so much more important as for instance in Germany compressed gas comes on the market compressed only to 125 atmospheres.

The reasons why this apparatus gives a good efficiency by the low pressures depend in the first instance on the construction of the regenerator, the tubes of which are not as usually spirally wound, but the whole regenerator consists of a plait of tubes, which are intertwined, whereby the tube supplying compressed air is bent considerably more than is usually the case, so that the compressed air on its way to the throttle valve 33 is thrown about inside and against the walls of the tubes. By means of this a good equalization of temperature takes place, so that the regenerator may be made very short and narrow, and consequently there are no large masses of material to be cooled, and thus the amount of liquefied gas will be increased. The result of this arrangement of the regenerator tubes shows itself especially in the starting of the liquefaction within a short time (viz. 2 or 3 or at most 5 minutes) notwithstanding that it is not necessary to use high pressures of about 200 atmospheres.

By means of the arrangement with the vacuum vessel described above there is no necessity to draw off the liquefied gas whereby the disadvantage of the glass vessel bursting is prevented, and the advantage of obtaining more liquefied gas is achieved as no losses through drawing-off occur. Finally through the arrangement of the first temperature exchanger 19 and the outer wall of the vacuum vessel D the advantage is obtained, that the upper part of this vessel is at the beginning of the process slowly cooled and remains cooled, while farther toward the outside a slow graduation of the temperature takes place until ordinary temperature is reached. Thus, on those places of the glass where the outside and inside cylinders are joined there is no great difference in temperature and therefore also no great difference in tension. With all the apparatus hitherto known this efficient protection of the vacuum vessel does not exist, and the liquefied gas can not be removed in the same simple way only by means of the removal of the glass vessel which surrounds the regenerator. Finally the arrangement of plaited tubes for the purpose of the most quick and efficient equalization of temperature is not to be found in other apparatus.

The apparatus may also be adapted for gas liquefaction without the use of a freezing-mixture. In this case the temperature exchanger will have to be made slightly longer.

Fig. 2 illustrates a modification of the apparatus which is constructed as follows: The cooler $A^1$ (corresponding to cooler A shown in Fig. 1) is made from a conveniently pressed disk 44, an upper bottom 45 and a lower bottom 46, all these parts being of sheet metal and soldered up to form a double-walled vessel open at top, which can be placed on some table or other support (not shown). The space between the two walls and two bottoms is again filled up with a bad heat conductor. Within the double-walled vessel is disposed a metallic coil 47, the two ends of which are connected with vertical tubes 48 and 49 passing through the two bottoms 45 and 46 and fastened therein by soldering. A bent draining tube 50 is secured by soldering in the two bottoms and is covered at its upper end with a sieve 51. Its lower end can be connected with some hose 52 by means of a clamp 53 of any known construction, so that it is possible to conduct the liquid to be discharged from the freezing-mixture to some place. A bent tube 54 is soldered on the cooler $A^1$ and is provided with a screwed piece 55, which is provided with a manometer 56 and can be in any known manner connected with any steel cylinder containing the compressed gas. At the underside of the bottom 46 are fastened by soldering two concentric cylinders 57 and 58, of which the inner one 58 has its lower part reduced in diameter and is shown to be longer than the outer cylinder 57. A central tube 59 (corresponding to tube 25 in Fig. 1) is secured in the two bottoms 45 and 46 and carries at its lower end a valve-casing 60 shown at Fig. 3. Within the upper wider part of the cylinder 58 is disposed a coil 61 with many turns serving as a first temperature exchanger. The lower end of this coil 61 is connected with the already mentioned tube 48, while its upper end is connected by a tube 62 with the tube 54. The lower end of the tube 49 is connected with the thin tubes 63, 63 of a regenerator $C^1$ similar in construction to C in Fig. 1. The lower ends of the thin tubes 63, 63 are introduced into radial channels 64, 64 of the valve casing 60 and are therein secured by soldering. The throttle valve 65 can be operated from the hand-wheel 66 by means of the spindle 67 engaging with its screwed part 68 in the valve casing 60, so that the compressed gas can escape through the channels 69, 69. The vacuum vessel $D^1$ has another shape and is so arranged, that its neck can be introduced through a suitable annular stopper 70 and made to bear with its upper edge against the shoulder of the cylinder 58. A supporting ring 71 with chains 72, 72 or the like suspended from hooks 73, 73 on the outer cylinder 57 may be employed for holding the vacuum vessel $D^1$ during its charge. A funnel 74 fastened on the valve casing 60 by soldering or otherwise may be employed for collecting the liquefied gas and conducting it in a jet downward. A tube 75 passing through the two cylinders 57 and 58 beneath the cooler $A^1$ serves as an outlet for the escaping spent gas. A thin tube 76 communicating with the inner cylinder 58 may be disposed immediately beneath the tube 75, so that its outer bent end can be connected with a U-shaped glass tube 77 by means of a sleeve 78 of rubber or other elastic material. The glass tube 77 may be partly filled with water or glycerin or the like and serves as a gage for measuring the pressure of the upwardly passing current air within the cylinder 58 immediately beneath the outlet 75. Thereby it is rendered possible to approximately estimate the quantity of gas escaping from the throttle valve 65. The upper part of the annular space between the two cylinders 57 and 58 is filled up with a bad heat conductor and corresponds to the protecting vessel B in Fig. 1. It will be seen, that in this modified apparatus the gas escaping from the throttle valve 65 passes constantly upward before it escapes through the outlet 75.

The apparatus, in either of the constructions described, is in the first place intended for the liquefaction of air, although it may also be used for the liquefaction of other gases like oxygen, coal gas, nitrogen etc.

I claim:

1. In a gas liquefying apparatus for demonstration purposes, the combination with a coil adapted to receive compressed gas, of a protecting vessel surrounding said coil, an annular regenerator connected with said coil and consisting of thin plaited tubes wound spirally, a valve casing comprising a chamber with channels into which the thin tubes of said regenerator terminate, a throttle valve in said valve casing and adapted to open and close its chamber, a spindle passing through said annular regenerator and adapted to operate said throttle valve, a double-walled glass vessel having a vacuum formed between its two walls and adapted to be moved with its neck over said regenerator from below for receiving liquefied gas, and means for supporting said glass vessel, the gas coming from said throttle valve being enabled to cool first said regenerator and then said coil before escaping.

2. In a gas liquefying apparatus for demonstration purposes, the combination with a coil adapted to receive compressed gas, of a protecting vessel surrounding said coil, a second coil above said coil and connected therewith, a second protecting vessel containing said second coil and adapted to contain a freezing mixture for cooling the compressed gas, an annular regenerator beneath said second protecting vessel and connected with said second coil and consisting of thin plaited tubes wound spirally, a valve casing comprising a chamber with channels into which the thin tubes of said regenerator terminate, a throttle valve in said valve casing and adapted to open and close its chamber, a spindle passing through said annular regenerator and adapted to operate said throttle valve, a double-walled glass vessel having a vacuum formed between its walls and adapted to be moved with its neck over said regenerator from below for receiving liquefied gas, and means for supporting said glass vessel, the gas coming from said throttle valve being enabled to cool first said regenerator and then said coil before escaping.

3. In a gas liquefying apparatus for demonstration purposes, the combination with a double-walled cooler adapted to be placed on some support and having the space between its two walls filled up with a bad heat conductor, of an outer cylinder secured at the underside of said cooler and having a widened lower edge, an annular stopper fitting to the lower edge of said outer cylinder, an inner cylinder secured at the underside of said cooler concentrically with said first cylinder and having its lower part reduced in diameter so as to present a shoulder, a tube at the underside of said cooler and passing through said outer cylinder for communicating with said inner cylinder, a central tube secured in the two bottoms of said cooler and extending from about the lower end of said inner cylinder to a point above the edge of said cooler, a valve casing at the lower end of said central tube and comprising a chamber with channels, a throttle valve in said valve casing and adapted to open and close its chamber, a spindle passing through said central tube and adapted to operate said throttle valve, a connection secured at the underside of said cooler and adapted to receive compressed gas, a coil in the upper wider part of said inner cylinder and connected with said connection, a second coil within said cooler and adapted to be cooled therein by a freezing-mixture, it being connected at one end with said coil, a regenerator in the lower narrow part of said inner cylinder and connected with the other end of said second coil and consisting of thin plaited tubes wound spirally which terminate in the channels of said valve-casing, a double-walled glass vessel having a vacuum formed between its two walls and adapted to be introduced with its neck from below through said annular stopper and to be pressed against the shoulder of said inner cylinder for receiving liquefied gas, hooks on said outer cylinder, a ring adapted to support said glass vessel and means for connecting said ring with said hooks, the gas coming from said throttle valve being enabled to cool first said regenerator and then said coil before escaping.

WILHELM PAUL SCHNEIDER.

Witnesses:
  GUSTAF HENRIK RYBERG,
  LEOPOLD LINDBÄCK.